Figure 7:
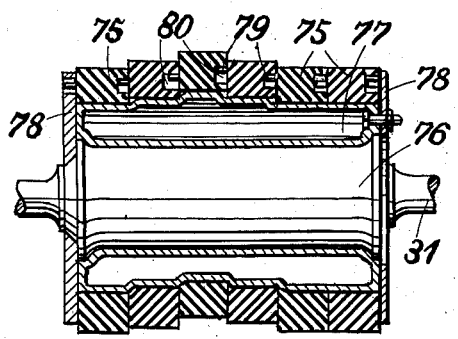

March 14, 1961 F. WITZMANN 2,974,741
DEVICE FOR INCREASING THE SAFETY OF MOTOR VEHICLES
DRIVING ON WET OR SNOW- OR ICE-COVERED ROADWAYS
Filed Oct. 22, 1958 5 Sheets-Sheet 1
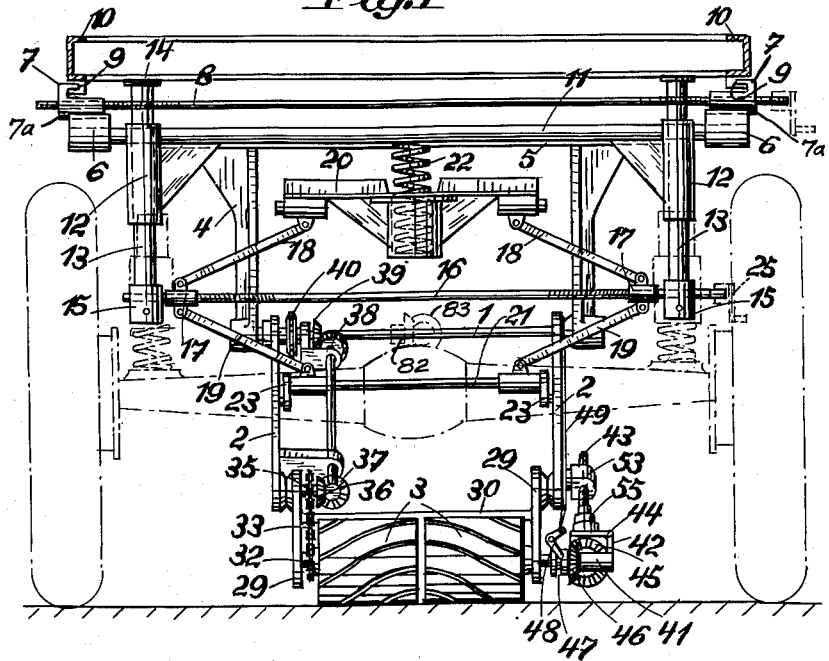
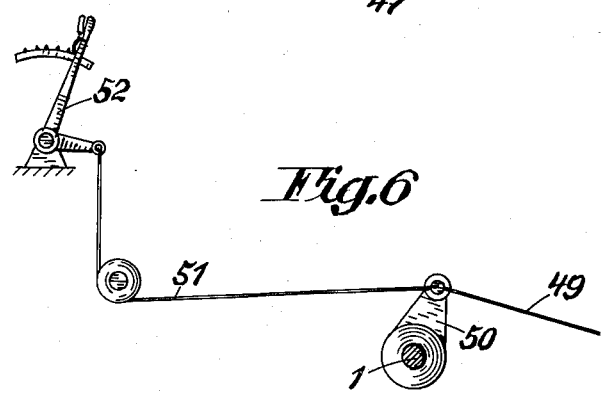
INVENTOR.
Franz Witzmann
BY
Michael S. Striker
Attorney

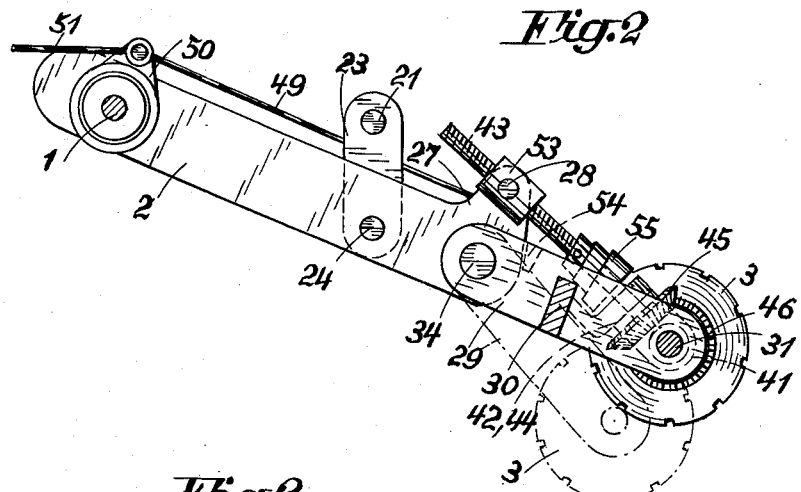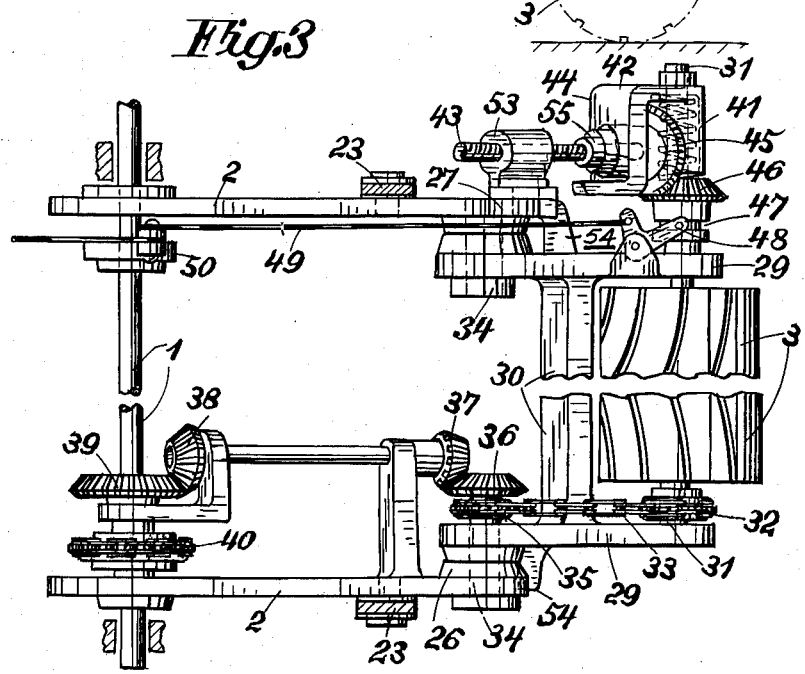

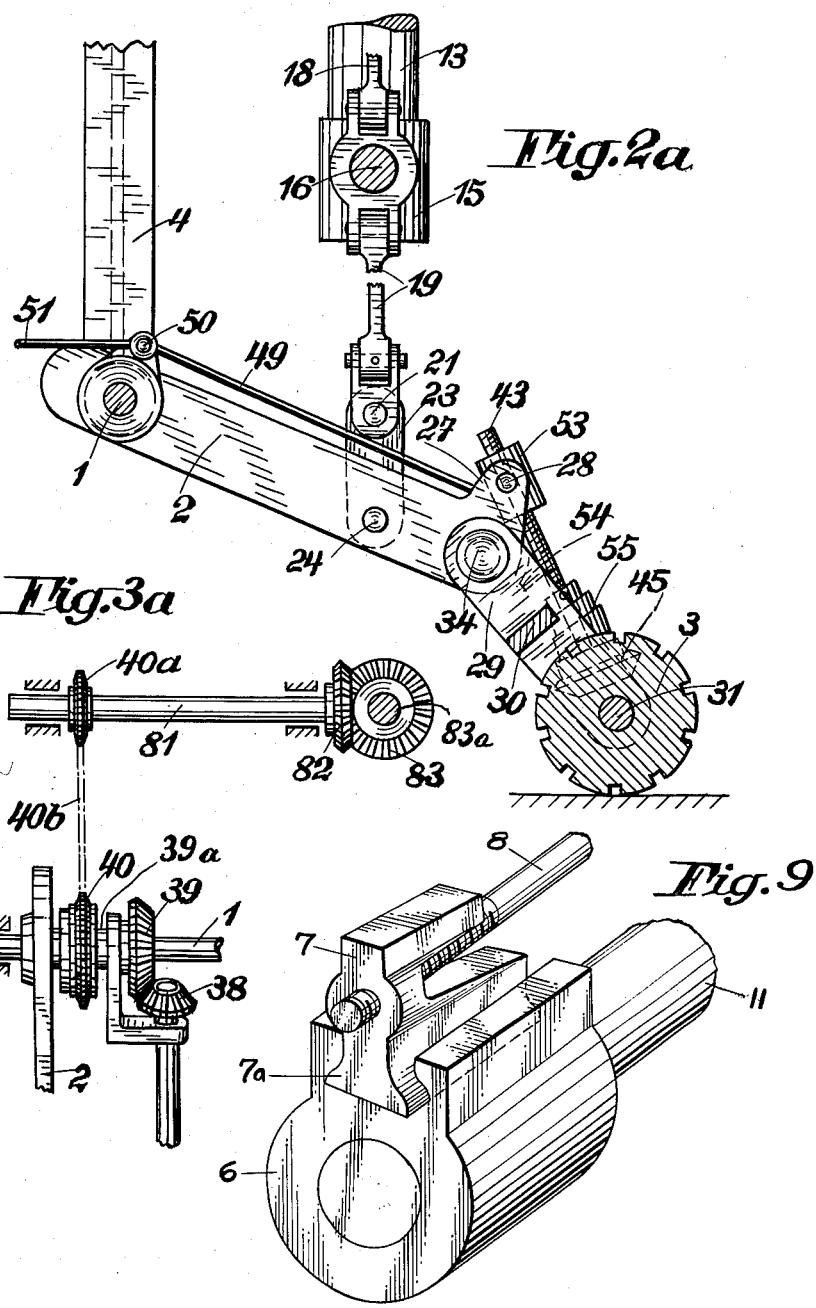

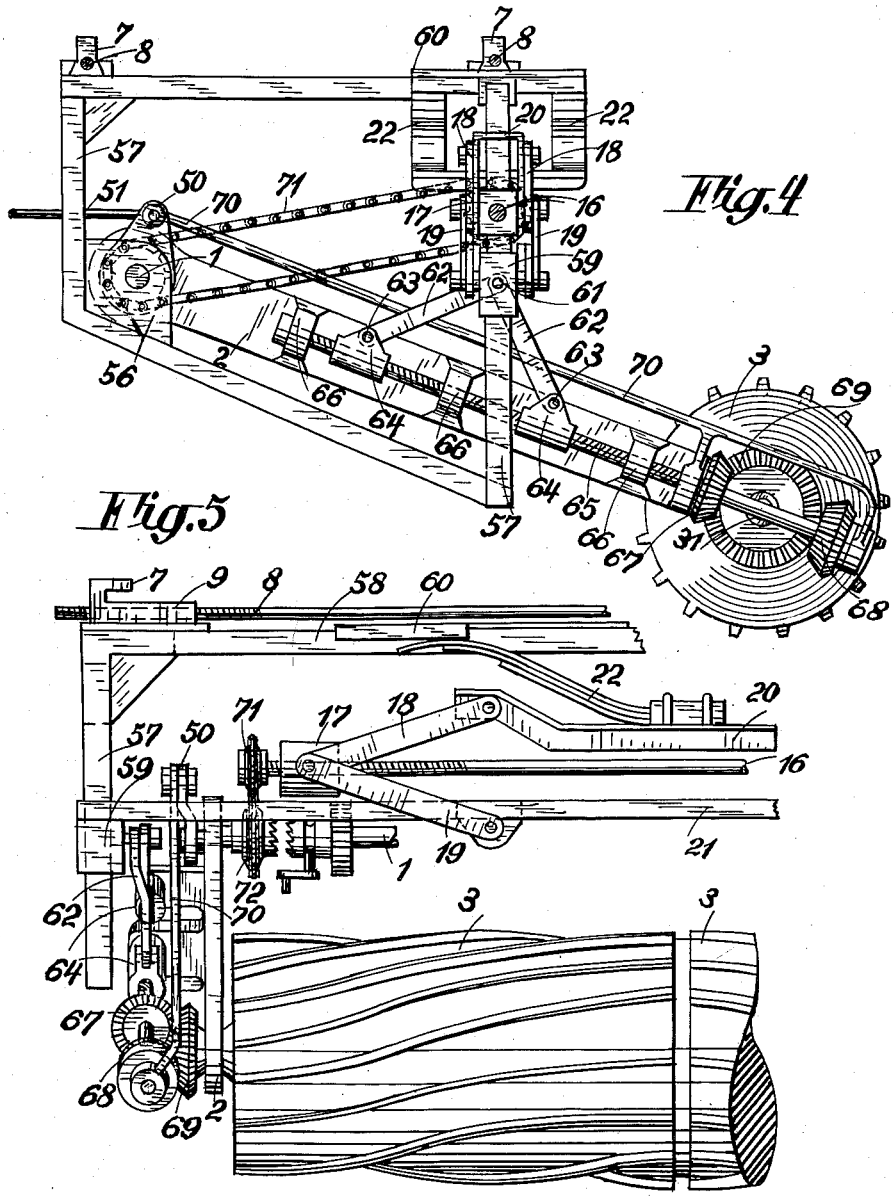

March 14, 1961     F. WITZMANN     2,974,741
DEVICE FOR INCREASING THE SAFETY OF MOTOR VEHICLES
DRIVING ON WET OR SNOW- OR ICE-COVERED ROADWAYS
Filed Oct. 22, 1958     5 Sheets-Sheet 5

INVENTOR.
Franz Witzmann
BY Michael S. Striker
Attorney

United States Patent Office 2,974,741
Patented Mar. 14, 1961

2,974,741
DEVICE FOR INCREASING THE SAFETY OF MOTOR VEHICLES DRIVING ON WET OR SNOW- OR ICE-COVERED ROADWAYS

Franz Witzmann, Obersteinergasse 7, Vienna, Austria

Filed Oct. 22, 1958, Ser. No. 769,015

Claims priority, application Austria Oct. 24, 1957

8 Claims. (Cl. 180—15)

This invention relates to a device for increasing the safety of motor vehicles driving on wet or snow- or ice-covered roadways, which apparatus comprises one or several rollers having friction-increasing gripping members, which roller or rollers are suspended in the chassis symmetrically with respect to the longitudinal centre line of vehicle so as to be spaced above the roadway and can be lowered to engage the roadway under pressure. The main feature of this invention resides in that the roller or rollers can be lowered onto the roadway in or as close as possible to the longitudinal centre plane of the vehicle and can be coupled to the drive of the vehicle, e.g., to the main shaft or the rear axle so that they can either be put into operation as a driving member in addition to the driven vehicle wheels or as a driven braking aid and antiskid device.

In order to increase the bearing pressure of the roller or rollers at the beginning of the movement of a motor vehicle or of a brake operation, a pressure applying device which is adapted to be mechanically, electrically or electromagnetically controlled, is interposed between a lifting and lowering mechanism, which bears at its upper end with one or several springs on the chassis of the vehicle, and the roller or rollers, which pressure applying device has adjusting members which are adapted to be coupled to the rollers as required and when coupled are adjustable to under the kinetic energy of the rollers against the action of the spring of the lifting and lowering mechanism to increase the bearing pressure on the roadway. Such a pressure applying device imparts to the rollers that maximum bearing friction and that applied moment on the roadway which enables the intended initial movement or brake operation to be performed with great reliability.

According to the invention this pressure applying device may consist of a jointed triangle comprising at least one jointed member which is variable in effective length by means of several adjusting members, which can be coupled to the rollers for rotation therewith when required and which when the adjusting members are coupled acts either on the swing frame carrying the rollers or on a pressure frame pivoted to the end of the swing frame and carrying the rollers so as to increase the bearing pressure of the rollers.

Figure 8:
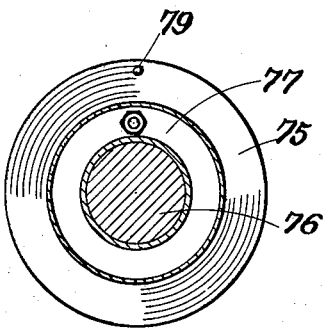

The drawing shows three illustrative embodiments of the pressure applying device according to the invention. Fig. 1 is a front view showing the device as viewed from the rear of the vehicle with the rear wheels of the vehicle indicated with dash-and-dot lines. Figs. 2 and 2a are side elevations showing parts of one embodiment of the pressure applying device. Fig. 3 is a top plan view, of the pressure applying device, and Fig. 3a is a fragmentary rear elevation of parts of the pressure applying device. Figs. 4 and 5, respectively, illustrate another embodiment in a side elevation and in a rear view taken on the rear end of the vehicle, only the left-hand half of the device being shown. Fig. 6 is a diagrammatical elevation showing a detail of the shifting elements. Figs. 7 and 8 show composite rollers in a partly axial sectional view and in a cross-sectional view; and Fig. 9 is a perspective view illustrating a detail of the device shown in Fig. 1.

The lifting and lowering device consists essentially of a swing frame 2, which is vertically pivotally movably mounted on the horizontal shaft 1 and is intended for carrying the roller or rollers 3. The swing frame shaft 1 is mounted in the lower ends of depending arms 4 of a frame which further includes a horizontal member 5 connecting arms 4 as shown in Fig. 1, the fourth frame member of which is formed by the swing frame shaft 1. As best shown in Fig. 9, jaws 6 are affixed to the ends of the horizontal frame member 5 and have mounted thereon anchoring hooks 7 having dovetails slidable in matching grooves in members 6, the grooves extending in the longitudinal direction of the frame member 5. The anchoring hooks 7 are formed as nuts and can be moved together or apart by rotating a screw-threaded spindle 8 provided with oppositely handed screw threads. In this way the nuts may be engaged with or disengaged from notches 9 of the chassis 10. Thus the frame including arms 4, member 5 and shaft 1 can be rigidly and detachably affixed to the chassis 10 of a vehicle to extend transversely to the longitudinal direction of said vehicle. A shaft 11 carrying guide tubes 12 for the lifting and lowering device can also be affixed to the underside of the chassis 10 by means of jaws 6 and the anchoring hooks 7 relatively movable by a screw-threaded spindle 8. Two carrying rods 13 are vertically slidable in the guides 12 and have the upper ends formed each as a collar 14 whereas their lower ends form bearing heads 15 for a horizontally mounted screw-threaded spindle 16. The screw-threaded spindle 16 has left- and right-handed screw threads for two nuts 17. Each of these two nuts 17 is articulatedly connected by a link 18 or 19 to an upper supporting beam 20 and a lower pressure beam 21 so that the supporting beam 20 and the pressure beam 21 are carried by two pantograph elements 18, 19 in a horizontal position spaced above and below the screw-threaded spindle 16. The supporting beam 20 bears by means of a compression spring 22 on the horizontal frame member 11. The lower pressure beam 21 is positively connected, e.g., by two links 23, to the swing frame 2. The links 23 are jointed and secured each by two pins 24 (Fig. 2) to the pressure beam and to the swing frame 2, respectively.

The screw-threaded spindle 16 is rotated by means of a crank 25 fitted thereon to move the two nuts 17 towards each other or apart and thus to open or close the pantograph links 18, 19. When the pantograph links 18, 19 are open or spread apart the swing frame 2 is swung down until the roller or rollers 3 engage the roadway. When the two nuts 17 are moved apart the pantograph links 18, 19 will swing toward each other to swing the swing frame 2 upwardly and lift the rollers 3 from the roadway. The slidable carrying rods 13 rest with their collars 14 on the guides 12 and hold the lifting and lowering device against the action of the spring 22 of the supporting beam 20.

The swing frame 2 carries at its other end the pressure applying device for the rollers 3. This device consists of a jointed triangle comprising one member of variable effective length. To this end the swing frame 2 has at the free end of its longitudinal members in addition to a bearing eye 26 a rigid arm 27, which protrudes at right angles in the plane of the frame member and has a second bearing eye 28. The lower bearing eyes 26 of the swing frame arms have mounted therein for vertical pivotal movement a second, short frame 29, 30 of double-T shape. The parallel members 29 of this second frame are mounted each for vertical pivotal movement in one eye 26 of the swing frame arms and carry the shaft 31 of the roller or rollers 3 in their other eye provided at the outer end of the arm. This shaft 31 has on one side of the rollers 3 a sprocket 32, which is connected by a sprocket chain 33 to a sprocket 35 freely rotatably carried on a pivot pin 34. This chain drive 32, 35 serves for driving the two rollers 3, which form a unit, and is operatively connected by the bevel wheels 36–38 to a bevel gear 39 connected to a sprocket 40 by a hub 39a, which is freely rotatably mounted on the shaft 1 of the swing frame 2. Sprocket 40 is rotated by a chain 40b driven by a sprocket 40a from a gear 82 through a shaft 81, gear 82 meshes with a gear 83 driven from the drive system of the vehicle. All bevel wheels 36–39 are mounted in one frame member of the swing frame 2 whereas the elements of the pressure applying device are carried by the other parallel frame member. The shaft 31 of the rollers 3 protrudes laterally on the side of the pressure applying device beyond the pressure frame 29, 30 and extends into a hub 41 of a joint 42 for a screw-threaded spindle 43, which extends radially with respect to the shaft 31. The joint 42 transmits the spindle pressure. The spindle 43 carries at its end facing the shaft, between the hub 41 and the bearing arm 44 of the joint 42, a bevel wheel 45, the teeth of which mesh with a bevel wheel 46, which is axially slidably but non-rotatably mounted on the shaft 31 of the rollers 3. This bevel wheel 46 is mounted between one frame member 29 of the pressure frame and the hub 41 of the joint 42 and has in its hub an annular groove 47 for the pin of a bell-crank lever 48, which is pivoted to the pressure frame 29, 30 and has tension-resisting connection by a Bowden cable 49 or the like to a lever 50 freely rotatably mounted on the swing frame shaft 1. According to Fig. 6 this lever 50 is connected by a Bowden cable 51 to an adjusting lever 52, which is operable to engage the bevel wheel 46 axially slidably mounted on the shaft 31 with or disengage it from the bevel wheel 45 of the screw-threaded spindle 43, which forms that member of the jointed triangle which is variable in effective length. This screw-threaded spindle 43 is in threaded engagement with a nut 53 rotatably mounted by a pivot pin 28a in the bearing eye 28 of the swing frame member 27 which constitutes the third member of a jointed triangle, which further comprises the pressure frame member 29 and a short arm knee 27 of the swing frame member 2. The corners of said triangle consist of the shaft 31 of the rollers 3, the pivot pin 34 of the pressure frame 29, 30 and the pivot pin 28 of the nut 53. This jointed triangle is in its normal position with members 2 and 29 aligned when a stop 54 on one arm 29 is in endwise engagement with the arm 27 on one swing frame member 2 as shown in Fig. 2. In this case the swing frame 2 and the pressure frame 29, 30 are in an extended position, as is shown in Fig. 2. When the screw-threaded spindle 43 is rotated in the nut 53 to increase the effective length of said spindle as well as the spacing of the shaft 31 from the bearing 28 in the end of arm 27 compared to the normal position of the jointed triangle, this will cause the pressure frame 29, 30 and with it the rollers 3 to swing down while stop 54 moves away from arm 27. In this case the swing frame 2 and the pressure frame 29, 30 include a larger or smaller obtuse angle, which is distinctly apparent from the position of the pressure frame 29, 30 shown with dash-and-dot lines in the drawing.

Operation of crank 25 will effect movement of nuts 15 and displacement of arms 18, 19 acting on frame 2 through links 23 so that frame 2 turns about shaft 1 to lower frame 29, 30 to a position in which rollers 3 engage the road surface. Rollers 3 are driven through transmission 32, 33, 35 to 40, chain 40b, sprocket 40a, shaft 81, gears 82, 83 from the drive shaft 83a. It is of essential importance that the control of the pressure frame 29, 30 is effected by the rollers 3 themselves which transmit their torque to the screw-threaded spindle 43 as soon as the bevel wheels 45, 46 are manually engaged. As a result, this spindle 43 is rotated and at the same time is screwed back in the nut 53 whereby its effective length and with it the bearing pressure of the rollers 3 on the roadway increase progressively. When the rollers 3 grip correctly, the bevel gear 46 may be manually disengaged by means of the hand lever 52 to interrupt the connection between the rollers 3 and the screw-threaded spindle 43. The return of the pressure frame 29, 30 to its normal position shown in Fig. 2 may either be effected by a backward rotation of the rollers 3 after they have been lifted from the ground or by means of a torsion spring 55 strained by the rotation of the spindle.

Another illustrative embodiment of the pressure applying device is apparent from Figs. 4 and 5.

In this case the pivot 1 of the swing frame 2 is rotatably mounted in bearing plates 56 of two side frames 57, which belong to a frame structure 58, which can be detachably connected to the chassis 10 by means of two hooks 7, which can be moved towards each other or apart by means of a screw-threaded spindle 8 having oppositely handed screw-threads. Each side frame 57 has a vertical frame member formed as a slide rail and each of said slide rails carries a slide jaw 59 of a so-called pressure beam 21. The pressure beam 21 is connected to the lifting and lowering device in the manner described hereinbefore and to this end is connected by means of two pairs of pantograph links 18, 19 to two nuts 17 and to the supporting beam 20, which bears at its top, e.g., by means of leaf spring sets 22, on a cross member 58 of the frame structure or of the chassis 10 of the vehicle. For this purpose the cross member 58 has special spring abutments 60. The two nuts 17 of the links 18, 19 are interconnected by their screw-threaded spindle 16, which has oppositely handed screw threads to move the nuts 17 either towards each other to open the angle between the pantograph links 18, 19, or apart, to reduce the angle between said links.

In this embodiment the pressure beam 21 does not act through intermediate members 23 as in the first embodiment but a pair of jointed triangles of variable form is interposed between the pressure beam 21 and the swing frame 2. The upper joint 61 of each of said jointed triangles is provided on one slide jaw 59 of the pressure beam 21. The two adjustable links 62 of the jointed triangles are connected each by a joint 63 to a nut 64. These nuts are in threaded engagement with oppositely handed screw threads of a screw-threaded spindle 65. Each of the screw-threaded spindles 65 is rotatably mounted on the side of the swing frame 2 in bearing eyes 66 which laterally protrude from the longitudinal members of the frame. Furthermore, each screw-threaded spindle 65 is provided at the end directed towards the roller 3 with two bevel wheels 67, 68, which are axially slidable on the spindle but non-rotatably connected thereto. The two bevel wheels 67, 68 are sufficiently spaced to be alternately movable from an intermediate disengaged position into engagement with a bevel wheel 69 fixed on the shaft 31 of the rollers 3, for connection with the rollers 3. These bevel wheels 67, 68 are held and moved by a control linkage 70, which is connected to the one-armed lever 50, which according to Fig. 6 is freely rotatable on the swing lever shaft 1 and is operable by the hand lever 52.

In Figs. 4 and 5 only one half of the device is shown whereas the half which is provided with the drive for the rollers 3 is omitted to avoid repetition.

The mode of operation of this device is as follows: It is assumed that the pressure beam 21 has been sufficiently lowered from its raised position by means of the lifting and lowering device 16, 17, 18, 19 so that the rollers 3 are well in contact with the roadway. Nevertheless the driver wants further to increase the pressure applied by the rollers 3 to the roadway. To this end he operates the hand lever 52 to cause one of the two gears 67, 68 to engage the bevel wheel 69 of the rollers 3. At the same time the rotating rollers 3 will transmit their torque to the screw-threaded spindle 65, which moves the two nuts 64 and with them the joints 63 of the links 62 towards each other. As a result, the swing frame 2 is lowered further and the distance between it and the pressure beam 21 is increased. In accordance therewith the pressure applied by the rollers 3 to the roadway is increased too because the leaf springs 22 are additionally strained. The driver may shift the hand lever 52 to disengage the bevel wheel 67 of the screw-threaded spindle 65 or to shift the screw-threaded spindle to the other bevel wheel 68 in order to return the pressure applying device. In this case the rollers 3 drive the screw-threaded spindle 65 in the opposite sense of rotation to cause the jointed triangle to be restored.

It may be pointed out that the screw-threaded spindle 65 of the lifting and lowering device may be connected by a chain drive 71, 72 to the drive of the vehicle so that the driver can control all controlling and driving movements from the driver's seat.

To enable the roller 3 to adapt itself properly to uneven surfaces, it may be divided according to the invention into several rings 75, which lie one beside the other and are non-rotatably connected to the drive shaft, as is shown in Figs. 7 and 8. These rings are radially movably mounted on a hub 76 and bear on the same, e.g., by means of an air cushion 77 or several coil or annular springs. The hub 76, which is affixed to the drive shaft 31, has two cover discs 78, which are rigidly connected thereto and laterally hold all rings 75. Each ring has, e.g., on one radial surface a pin 79, on the other a radial slot 80 for receiving the pin of the adjacent ring 75 of the cover disc 78. Thus the rings are connected for rotation to each other and to the cover discs and are yet relatively axially movable, relatively to each other. The rings may also be driven only by the air cushion. Each of these rings can yield to uneven surface portions to ensure a permanent, varying adaptation of the periphery of the roller to uneven portions of the roadway.

The roller may also be used as a braking aid. For this purpose it rolls on the roadway without being driven.

The embodiments of the invention in which an exclusive property or privilege is claimed are defined as follows:

1. Auxiliary traction device for vehicles comprising, in combination, first supporting means adapted to be movably mounted on a vehicle; second supporting means movably mounted on said first supporting means; traction roller means turnably mounted on said second supporting means; moving means for moving said first supporting means to a position in which said traction roller means are adapted to engage the ground; drive means at least partly mounted on said second supporting means for driving said traction roller means; operating means for moving said second supporting means with said traction roller means relative to said first supporting means so that said traction roller means are pressed against the ground or raised; and operator influenced coupling means for connecting said operating means to said drive means so that said second supporting means are operated from said drive means.

2. Auxiliary traction device for vehicles comprising, in combination, first supporting means adapted to be movably mounted on a vehicle; second supporting means movably mounted on said first supporting means and including a plurality of members, and pivot means articulating said members to each other to form a triangular structure, and to said first supporting means for supporting said structure on said first supporting means; traction roller means turnably mounted on said second supporting means; moving means for moving said first supporting means to a position in which said traction roller means are adapted to engage the ground; drive means at least partly mounted on said second supporting means for driving said traction roller means; operating means for varying the length of the portion of one of said members between the associated two pivot means of said triangular structure for moving said second supporting means with said traction roller means relative to said first supporting means so that said traction roller means are pressed against the ground or raised; and operator influenced coupling means for connecting said operating means to said drive means so that said second supporting means are operated from said drive means.

3. Auxiliary traction device for vehicles comprising, in combination, a first supporting means adapted to be movably mounted on a vehicle; second supporting means movably mounted on said first supporting means and including three members and three pivot means articulating said members to each other, one of said members being a threaded spindle, and at least one of said pivot means including a nut means in threaded engagement with said spindle; traction roller means turnably mounted on said second supporting means; moving means for moving said first supporting means to a position in which said traction roller means are adapted to engage the ground; drive means at least partly mounted on said second supporting means for driving said traction roller means; operating means for turning said spindle for moving said second supporting means with said traction roller means relative to said first supporting means so that said traction roller means are pressed against the ground or raised; and operator influenced coupling means for connecting said operating means to said drive means so that said second supporting means are operated from said drive means.

4. Auxiliary traction device for vehicles comprising, in combination, first supporting means adapted to be movably mounted on a vehicle; second supporting means movably mounted on said first supporting means and including three members and three pivot means articulating said members to each other, one of said members being a threaded spindle, and at least one of said pivot means including a nut means in threaded engagement with said spindle; traction roller means turnably mounted on said second supporting means; moving means for moving said first supporting means to a position in which said traction roller means are adapted to engage the ground; drive means at least partly mounted on said second supporting means for driving said traction roller means; operating means for turning said spindle for moving said second supporting means with said traction roller means relative to said first supporting means so that said traction roller means are pressed against the ground or raised and including torsion spring means connected to said spindle; and operator influenced coupling means for connecting said operating means to said drive means so that said spindle is turned to press said traction roller means against the ground, and so that said torsion spring means turns said spindle to raise said traction roller means when said coupling means is shifted to an inoperative position.

5. A traction device as set forth in claim 3, including a shaft supporting said roller means on said second supporting means, said shaft having a portion constituting one of said pivot means; a sleeve turnably mounted on said shaft; and a member fixedly secured to said sleeve and said spindle for transmitting the pressure of said spindle to said shaft of said traction roller means.

6. Auxiliary traction device for vehicles comprising, in combination, first supporting means adapted to be movably mounted on a vehicle and including a pivoted arm having a transverse member; second supporting means movably mounted on said first supporting means and including a lever member pivotally connected to one end of said transverse member, a nut means pivotally connected to the other end of said transverse member, a pivot member turnably connected to said lever member, and a spindle in threaded engagement with said nut means and turnably supported in said pivot member so that said transverse member, said lever member and said spindle form a triangular structure; traction roller means turnably mounted on said second supporting means; moving means for moving said first supporting means to a position in which said traction roller means are adapted to engage the ground; drive means at least partly mounted on said second supporting means for driving said traction roller means; operating means including gear means for turning said spindle for moving said second supporting means with said traction roller means relative to said first supporting means so that said traction roller means are pressed against the ground or raised; and operator influenced coupling means for connecting said operating means to said drive means so that said second supporting means are operated from said drive means.

7. Auxiliary traction device for vehicles comprising, in combination, first supporting means adapted to be movably mounted on a vehicle; second supporting means including supporting lever means turnably mounted on said supporting means, a spindle mounted on said lever means and having opposite threads at the end portions thereof, a pair of pivot means including nuts with opposite thread in threaded engagement with said end portions of said spindle, respectively, a pair of levers articulated at one pair of ends to said pair of pivot means, a third pivot means connecting the other ends of said levers and being turnably mounted on said first supporting means so that said levers and the portion of said spindle between said nuts form a triangular structure, the length of one side of which is variable by turning of said spindle; traction roller means turnably mounted on said supporting lever means; moving means for moving said first supporting means to a position in which said traction roller means are adapted to engage the ground; drive means at least partly mounted on said second supporting means for driving said traction roller means; operating means including gear means for turning said spindle for moving said second supporting means with said traction roller means relative to said first supporting means so that said traction roller means are pressed against the ground or raised; and operator influenced coupling means for connecting said operating means to said drive means so that said second supporting means are operated from said drive means.

8. A traction device as set forth in claim 7, wherein said coupling means includes a bevel gear connected for rotation to said traction roller means and a pair of bevel gears connected to said spindle for rotation and being shiftable in axial direction of said spindle for selectively meshing with said bevel gear of said traction roller means so that by operation of said coupling means said traction roller means can be selectively raised or pressed against the ground.

References Cited in the file of this patent
UNITED STATES PATENTS

| | | |
|---|---|---|
| 1,337,672 | Steele | Apr. 20, 1920 |
| 2,002,518 | Baldwin | May 28, 1935 |
| 2,650,679 | Durkin | Sept. 1, 1953 |